July 3, 1923.  1,460,897
F. L. GREENLAW
HOSE REEL
Filed Aug. 21, 1922
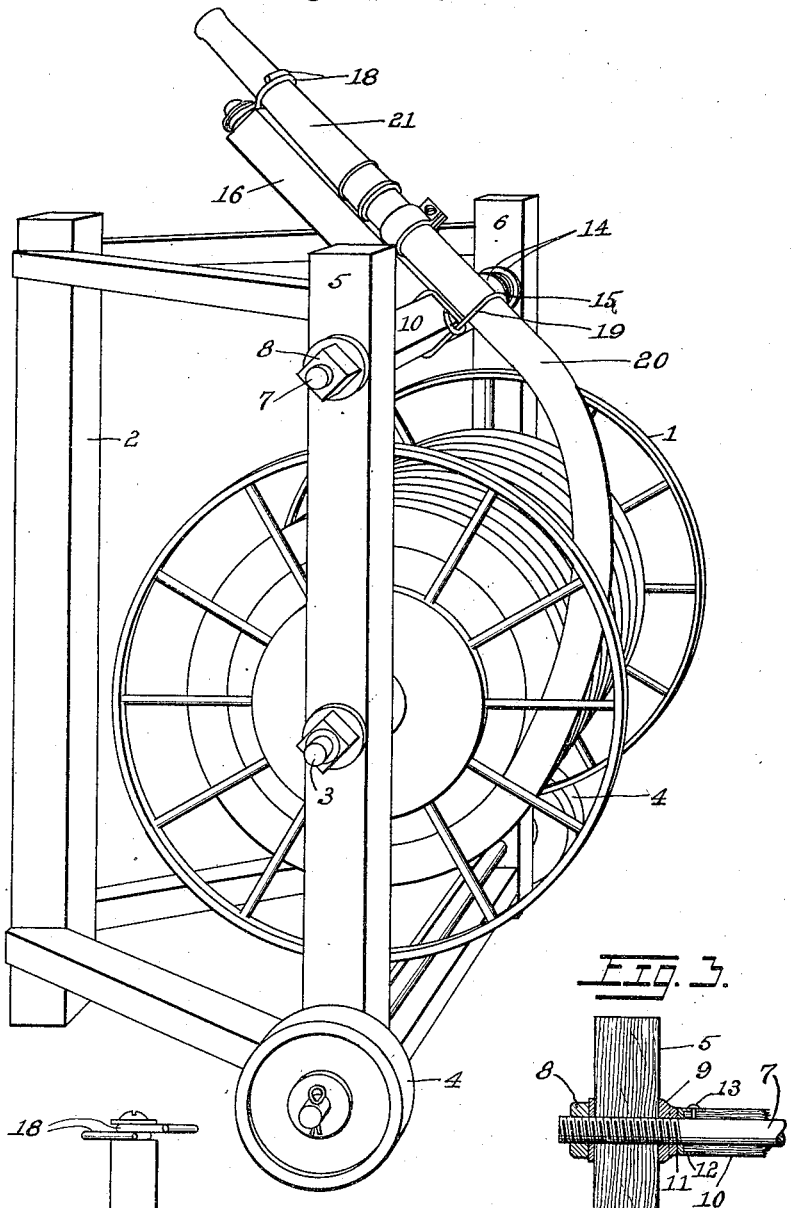
Inventor;
Frank L. Greenlaw,
per
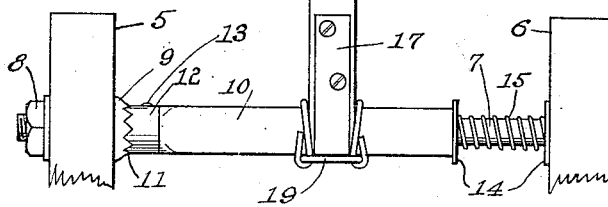
Attorney.

Patented July 3, 1923.

1,460,897

UNITED STATES PATENT OFFICE.

FRANK L. GREENLAW, OF LOS ANGELES, CALIFORNIA.

HOSE REEL.

Application filed August 21, 1922. Serial No. 583,417.

*To all whom it may concern:*

Be it known that I, FRANK L. GREENLAW, a citizen of the United States, residing at Los Angeles, in the county of Los Angeles and State of California, have invented new and useful Improvements in Hose Reels, of which the following is a specification.

My invention relates to improvements in hose reels, and particularly to such reels as are adapted for holding a hose nozzle while it is playing. The objects of my invention are, first, to furnish facilities for conveniently attaching the hose nozzle to the reel, and, second, to provide very simple and effective means for varying the angular position of the nozzle.

Other objects and advantages will appear hereinafter and while I show herewith and will describe a preferred form of construction, I desire to be understood that I do not limit myself to such preferred form, but that various changes and adaptations may be made therein without departing from the spirit of my invention as hereinafter claimed.

My objects are attained by the device illustrated in the accompanying drawing, in which:—

Figure 1 is a perspective view of the complete reel with a hose and nozzle in place thereon; Figure 2 is a fragmentary front elevation of the upper part of the reel illustrating the means employed for varying the angular position of the nozzle as well as the nozzle attachment; and Figure 3 is a fragmentary sectional elevation of the left hand portion of the parts shown in Fig. 2 taken on the longitudinal center line thereof.

Similar numerals refer to similar parts throughout the several views.

A satisfactory construction, which I have selected for illustrative purposes, is to mount any suitable hose reel 1 upon a three post frame 2. This mounting should be so arranged that the reel is free to revolve about a central shaft as indicated at 3. I also prefer to equip the frame with small wheels 4 for convenience in moving the device about.

The space between the upper ends of posts 5 and 6 is spanned by a threaded steel rod 7. The nut 8, cooperating with a special tapped fitting 9, serves to clamp the rod firmly to post 5, and a somewhat similar construction is used at post 6 although, in this case, the post is yieldingly clamped to the rod. The squared sleeve 10 is mounted on rod 7 and is free to turn thereon except as constrained by the circular ratchet 11 at its left hand end. This ratchet device comprises serrations or teeth cut in the respective transverse faces of special fitting 9 and sleeve 12. This latter is affixed to the left end of 10 by means of a pin, as at 13, or other suitable device to prevent its turning. The washers 14, and spring 15, serve to normally keep the cooperating ratchet parts engaged.

Extending transversely from member 10 is an arm 16 affixed in a suitable manner, as by the brace 17. Arm 16 carries the nozzle clamping device 18 at its outer end, and the hose loop 19 near its base. This arrangement makes it possible to quickly and conveniently attach the hose 20 and to clamp nozzle 21 to arm 16. The latter can then be set to any desired vertical angle by means of the ratchet device.

The operation of my invention will be apparent from the foregoing description. The nut 22 can be used to regulate the compression of spring 15 as the frame can be sprung sufficiently for this purpose. When spring 15 exerts sufficient pressure upon the parts of ratchet 11, the arm 16 will support the hose nozzle in any desired angular position within the limitations of the ratchet.

I claim as my invention:

1. A hose reel comprising a frame having a reel revolubly mounted thereon; an arm revolvable about a horizontal axis mounted upon said frame, said arm having nozzle attaching means thereon; and means for variably adjusting the angular position of said arm.

2. A hose reel comprising a frame having a reel revolubly mounted thereon; an arm revolubly mounted on said frame, said arm being adapted to swing in a vertical plane and having means for attaching a nozzle thereto; and means for variably adjusting the angular position of said arm.

3. A hose reel comprising a frame having a reel revolubly mounted thereon, an arm pivoted upon said frame and adapted to swing in a vertical plane, said arm having means for attaching a nozzle thereto; and means consisting of engaged serrated surfaces for variably adjusting the angular position of said arm.

4. A hose heel comprising a frame having a reel revolubly mounted thereon; a pivoted arm adapted to swing in a vertical plane, said arm having means for attaching a nozzle thereto; and spring constrained serrated surfaces adapted for variably adjusting the angular position of said arm.

FRANK L. GREENLAW.